May 20, 1969  J. O. STEWART  3,445,125
TRAILER HITCH
Filed Aug. 25, 1967  Sheet 1 of 3
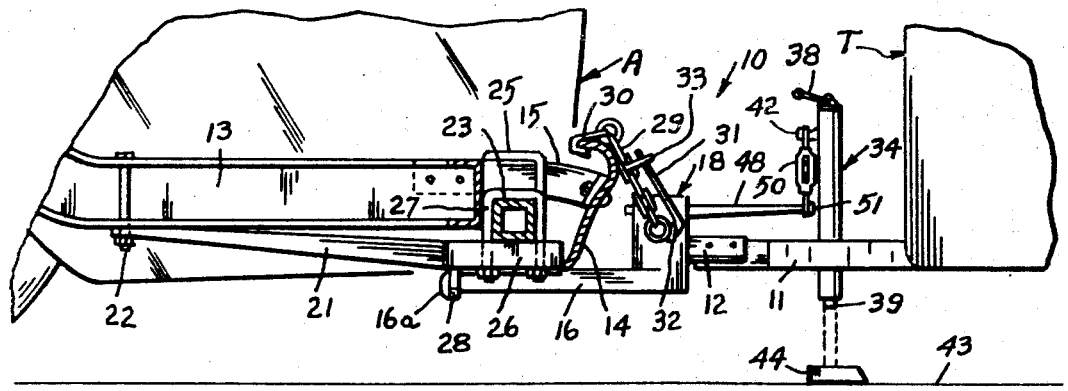
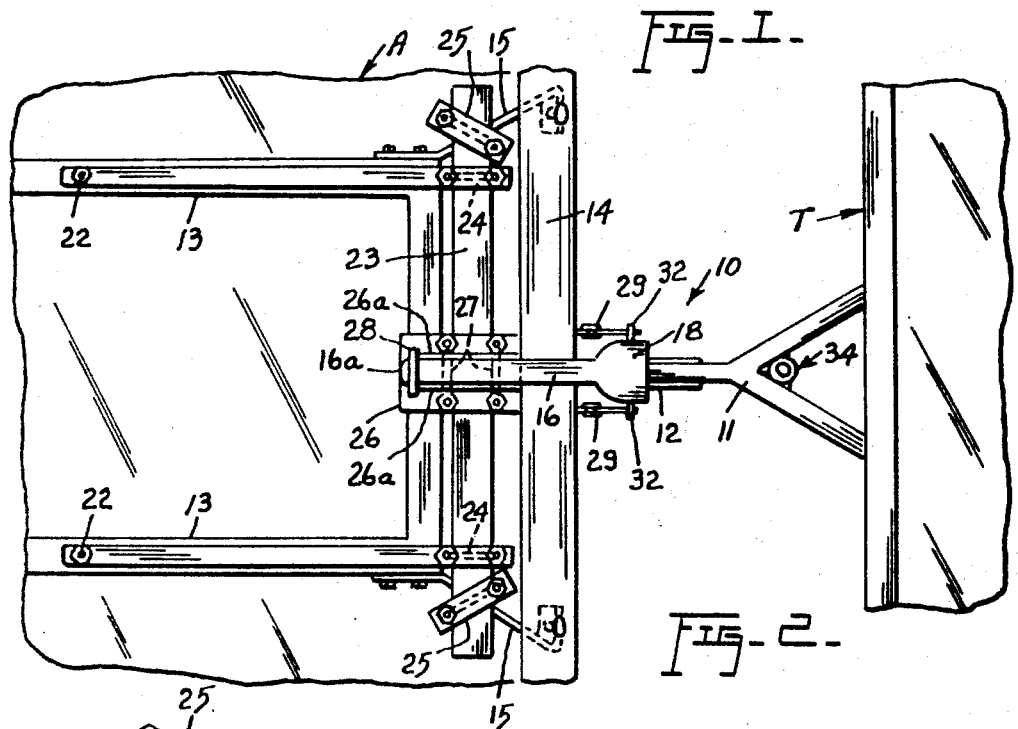
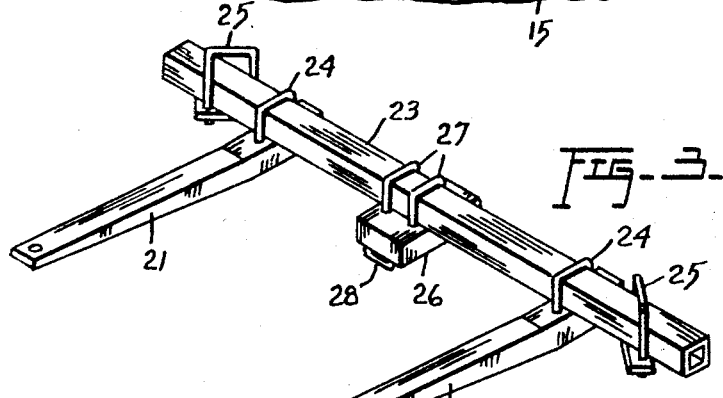
INVENTOR
John O. Stewart
BY Munson H. Lane
ATTORNEY May 20, 1969   J. O. STEWART   3,445,125
TRAILER HITCH
Filed Aug. 25, 1967   Sheet 2 of 3
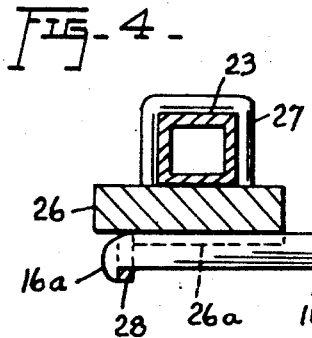
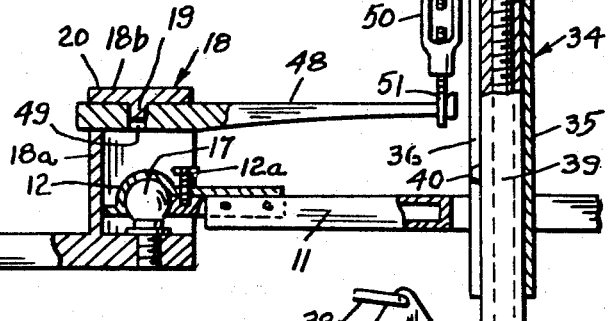
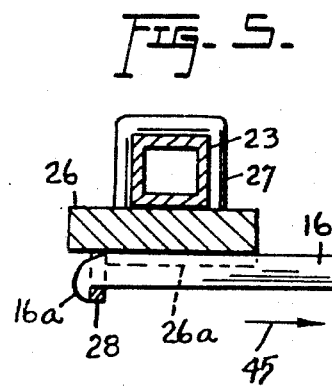
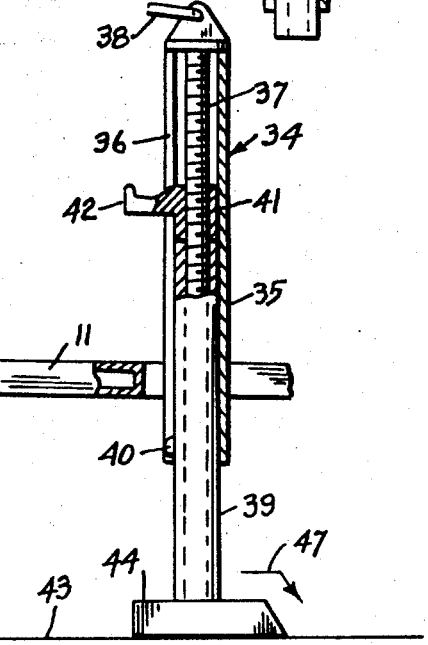
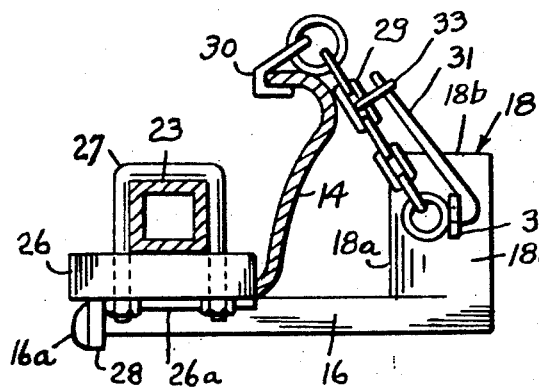
INVENTOR
John O. Stewart
BY Munson H. Lane
ATTORNEY

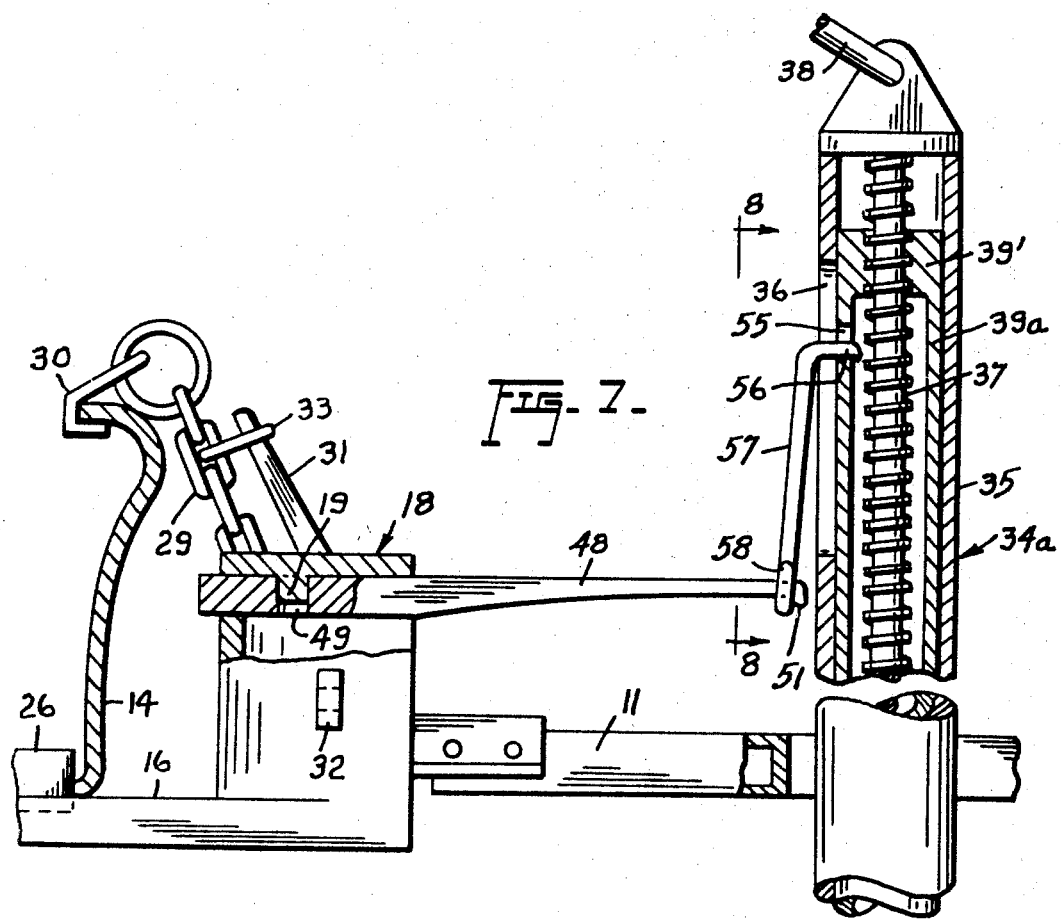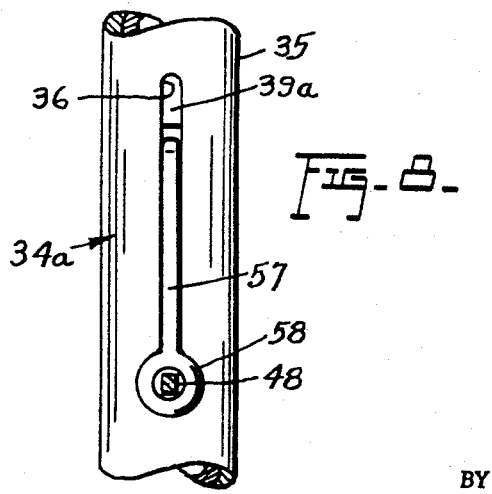

United States Patent Office 3,445,125
Patented May 20, 1969

3,445,125
TRAILER HITCH
John O. Stewart, Rte. 1, Russellville, Ark. 72801
Filed Aug. 25, 1967, Ser. No. 663,318
Int. Cl. B60s 9/04; B62d 53/00
U.S. Cl. 280—406                    10 Claims

ABSTRACT OF THE DISCLOSURE

An automobile-attached drawbar having a housing containing a ball. A trailer draft tongue has a socket receivable in the housing above the ball, and also has a vertical jack resting on a ground supported block. When the automobile is backed up, the socket is received in the housing and the housing pushes back the socket so that the jack slips off the ground block to automatically engage the socket with the ball. A stabilizer bar is supportably inserted in the housing and coacts with the jack to equalize the load and prevent sagging at the ball and socket.

---

This invention relates to new and useful improvements in trailer hitches used, for example, between a trailer and an automobile or some other tractive vehicle, and the principal object of the invention is to facilitate quick, convenient and efficient coupling of the hitch components by a simple backing movement of the automobile when the automobile and the trailer are to be connected together.

Another important object of the invention is to effectively stabilize the hitch assembly to afford equalization of load and prevent sagging at the ball and socket of the hitch.

Another object of the invention is to provide a hitch which may be quickly and easily attached to the frame and bumper of an automobile, which may be readily bumper sizes, and portions of which may be easily removed so that the hitch attachment is unobtrusive when the automobile is not used for towing a trailer.

Other advantages of the invention reside in its simplicity of construction, in its efficient and dependable operation, and in its adaptability to convenient and economical manufacture.

With the foregoing more important objects and features as may become apparent as this specification proceeds, the invention will be understood from the following description taken in conjunction with the accompanying drawings, wherein like characters of reference are used to designate like parts, and wherein:

FIG. 1 is a fragmentary view, partly in elevation and partly in vertical section, showing the hitch of the invention connecting a trailer to an automobile;

FIG. 2 is a fragmentary underside plan view of the subject shown in FIG. 1;

FIG. 3 is a perspective view showing the automobile attachment or mounting means for the drawbar;

FIG. 4 is an enlarged, fragmentary vertical sectional view of the hitch in its connected position;

FIG. 5 is a view similar to that in FIG. 4, but with the hitch in position to be connected;

FIG. 6 is an enlarged view, partly in side elevation and partly in section, showing the drawbar to bumper fastener means;

FIG. 7 is a fragmentary view, partly in side elevation and partly in vertical section, showing a modified arrangement of the stabilizer bar connection to the jack; and FIG. 8 is a fragmentary sectional view, taken substantially in the plane of the line 8—8 in FIG. 7.

Referring now to the accompanying drawings in detail, the general reference numeral 10 designates the hitch of the invention, such as may be used for connecting a trailer T to an automobile or some other tractive vehicle indicated at A. The trailer T is provided with a draft tongue 11 equipped at its front end with a conventional ball-receiving socket 12, the construction of which need not be described in detail since it is well known in the art. The automobile A has a frame or chassis including a pair of transversely spaced frame members 13, and a rear bumper 14 is carried by suitable brackets 15 secured to the frame members 13, as is customary.

The trailer hitch 10 includes a drawbar 16 equipped with a ball 17 for engagement by the aforementioned socket 12 as hereinafter described. The drawbar is formed integrally with an upstanding, substantially semi-cylindrical housing 18, which includes a front wall 18a, a top wall 18b, side walls 18c and a bottom wall provided by the drawbar 16 itself. The housing 18 is open rearwardly and the ball 17 is mounted on the drawbar 16 at the bottom of the housing. For purposes hereinafter explained, the top wall 18b is formed with a downwardly projecting pin 19, and the front wall 18a is provided at its junction with the top wall with an opening 20.

Means for attaching the drawbar 16 to the automobile A comprise a pair of transversely spaced arms 21 which are disposed longitudinally under the frame members 13 and have their front ends secured to the frame members by suitable bolts 22. A cross member 23 is secured to the rear end portions of the arms 21 by U-clamps 24, these clamps being adjustable on the cross member so as to provide for different spacing of the arms 21 as necessitated by the transverse spacing of the frame members 13 on different automobiles. For additional support, U-clamps 25 serve to secure the cross member 23 to the bumper brackets 15, as will be apparent. In this manner, the cross member 23 is rigidly supported at the rear end of the automobile frame, somewhat forwardly of the rear bumper 14.

A horizontal drawbar mounting plate 26 is secured to the underside of the cross member 23 by a pair of U-clamps 27, these being adjustable so that the plate 26 may be properly centered on the cross member between the arms 21. The plate 26 is provided at its underside with a depending eye 28 to removably receive a hooked front end 16a of the drawbar 16 which is disposed under the plate.

It will be apparent that the drawbar 16 may be swung downwardly about the fulcrum point of the end 16a in the eye 28, so as to permit the end 16a to be withdrawn from the eye and the drawbar separated from the mounting plate 26, whereby the drawbar mounting is unobtrusive and hidden from view when the automobile is not used for towing a trailer.

The drawbar 16 is firmly held in its operative position by a pair of fastener chains 29 provided at one end with hooks 30 to engage the upper edge of the bumper 14, as illustrated. The other ends of the chains 29 are equipped with keeper members 31 which pass through apertured lugs 32 provided on the side walls 18c of the housing 18, the members 31 being releasably locked in links or eyes 33 projecting laterally from the chains 29, as will be clearly understood. Thus, with the chains 29 fastened, the drawbar 16 is securely held in position against the underside of its mounting plate 26, but after the chains are removed, the drawbar may be readily separated from the mounting plate, as already described.

The draft tongue 11 of the trailer T is provided at a point rearwardly from the socket 12 with a vertical jack 34, including a tubular casing 35 which is rigidly secured, as by welding, or other suitable means, to the tongue 11 and is formed with a vertical slot 36. The jack also includes an actuating screw 37 rotated by a suitable handle 38, the screw being fixed against axial movement and operatively engaging an internally screw-threaded tubular extension 39 which is movable upwardly and downwardly in the casing 35 by rotation of the screw. The extension 39 is prevented from rotating by any suitable means, as for example, by a lug 40 on the extension projecting into the slot 36 in the casing. Also positioned in the casing above the extension 39 is a tubular boss 41 which is slidable along the screw 37 and is equipped with a hook-like element 42 projecting outwardly through the slot 36.

Reference is now drawn to FIG. 5 which shows the hitch components separated and in readiness to be coupled together. The jack 34 is adjusted so as to project the extension 39 downwardly toward the ground indicated at 43, so as to rest on a spacer block 44 which is positioned on the ground, the jack adjustment being such that the draft tongue socket 12 is disposed in a plane above the level of the ball 17. The automobile may then be backed up toward the relatively stationary trailer so that the socket 12 is received in the drawbar housing 18 above the ball 17 as shown in FIG. 5, and the socket 12 comes into abutment with the front wall 18a of the housing. As rearward movement of the automobile continues, the abutment wall 18a will push the socket 12 with the associated tongue 11, jack 34 and trailer T rearwardly as indicated by the arrows 45, 46, 47, until the jack extension 39 slips off the ground block 44. This will cause the tongue 11 to be lowered so that the socket 12 is automatically engaged with the ball 17, thus coupling the hitch components together. The socket may then be locked on the ball by tightening of the conventional locking screw 12a in the usual manner, and after the jack extension 39 is retracted to avoid interference with the ground, towing of the trailer by the automobile may commence.

However, it is desirable to equalize the load and prevent sagging at the ball and socket of the hitch, so that the rear end of the automobile is not unduly overloaded by the weight of the trailer. For this purpose the invention also provides a stabilizer bar 48 which is applied to the hitch after the components are coupled as already explained. The bar 48 has a front end portion which is insertable into the housing 18 into the opening 20 in the front wall 18a of the housing as will be apparent from FIG. 4, the front end portion of the bar also having an aperture 49 which receives the aforementioned pin 19 depending from the top wall 18b, so as to restrain the bar 48 against lateral movement.

The rear end of the stabilizer bar 48 receives an eye at the lower end of a turnbuckle 50, which also has an eye at its upper end positioned on the aforementioned hook-like element 42 of the jack 34, undesired disengagement of the turnbuckle from the bar 48 being prevented by an enlarged head 51 at the rear end of that bar.

After the components of the hitch have been coupled as aforesaid and the jack extension 39 is retracted from the ground, upward movement of the jack extension will slide the boss 41 with its hook-like element 42 upwardly, and this action will be transmitted through the turnbuckle 50 to the stabilizing bar 48, causing the latter to exert an upward force on the underside of the top wall 18b of the drawbar housing 18 to effect equalization of load and prevent sagging of the hitch at the ball and socket connection. Preferably, the stabilizing bar 48 is spring-like or resilient in the vertical direction, somewhat in the manner of a leaf spring, so that the load equalizing effect is attained with some degree of resilient cushioning. The extent of the resiliency may be adjusted either or both, by the turnbuckle 50 and the jack 34 itself.

With additional reference to the drawbar mounting plate 26, the same may be provided at the underside thereof with a pair of guides 26a to prevent lateral movement of the drawbar relative to the mounting plate.

Referring now to FIGS. 7 and 8, these illustrate a modified connection of the stabilizer bar 48 to the jack 34a which is of a slightly different construction than the jack 34.

Like the jack 34, the jack 34a includes a tubular casing 35 rigidly secured to the draft tongue 11 of the trailer, the casing having a vertical slot 36. The jack actuating screw 37, rotated by a suitable handle 38, operatively engages internally screw-threaded end portions 39' of a tubular jack extension 39a which is movable upwardly and downwardly in the casing 35 by rotation of the screw.

The aforementioned boss 41 and hook-like element 42 of the jack 34 are not present in the jack 34a, and the tubular extension 39a is provided with an aperture 55 in register with the slot 36 so that a hook-like end portion 56 of a lifting rod 57 may be inserted through the slot 36 into the aperture 55 and removably retained therein.

The lower end of the rod 57 is provided with an eye 58 to removably receive the free end of the stabilizer bar 48, the bar being prevented from slipping out of the eye by the head 51.

In this arrangement the aforementioned turnbuckle 50, of course, is not used, and as the jack 34a is actuated to slide the extension 39a upwardly along the screw 37, the lifting rod 57 will exert an upward pulling force on the free end of the stabilizer bar 48 to effect equalization of load and prevent sagging of the hitch at the ball and socket connection within the housing 18.

As previously indicated, the stabilizer bar 48 is somewhat spring-like to afford some degree of resilient cushioning in the load equalizing action, the amount of resilient tensioning of the stabilizer bar being adjustable simply by adjustment of the jack 34a.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention.

What is claimed as new is:

1. A self-engaging hitch assembly for connecting a trailer to an automobile, said hitch assembly comprising in combination of drawbar mounted at the rear of the automobile, a ball provided on said drawbar, an upstanding abutment provided on the drawbar forwardly of said ball, a draft tongue at the front of the trailer, a socket provided at the front end of said draft tongue, a vertical jack secured to the draft tongue rearwardly of said socket and having a jack member extensible downwardly toward the ground, and a spacer block positioned on the ground with the lower end of said extensible jack member resting thereon, said jack being initially adjusted to support said socket above said ball with the socket engaging said abutment so that when the automobile is moved rearwardly, the abutment pushes said socket and the trailer draft tongue rearwardly to displace the extensible jack member from said spacer block and permit lowering of the draft tongue to engage said socket with said ball.

2. The assembly as defined in claim 1 wherein said drawbar includes a rearwardly open housing having a bottom wall, a top wall and a front wall, said ball being mounted on said bottom wall and said front wall constituting said abutment.

3. The assembly as defined in claim 2 together with a stabilizer bar inserted in said housing in supporting engagement with the underside of said top wall and projecting rearwardly from the housing, and means operatively connecting the rear end of said stabilizer bar to said extensible jack member whereby an upward pulling force may be exerted on the stabilizer bar to equalize load and prevent sagging of the hitch assembly at the ball and socket.

4. The assembly as defined in claim 3 wherein said stabilizer bar is resiliently tensioned in the vertical direction.

5. The assembly as defined in claim 1 wherein said automobile includes a frame and a bumper at the rear end of said frame, together with means mounting said drawbar on the automobile, said mounting means comprising a pair of transversely spaced arms secured to said frame and extending rearwardly toward said bumper, a cross member adjustably secured to and extending between the rear ends of said arms, a horizontal mounting plate provided on said cross member between said arms, said drawbar being removably connected to and projecting rearwardly from said mounting plate.

6. The assembly as defined in claim 5 wherein said drawbar includes an upwardly projecting rearwardly open housing having a bottom wall, a top wall, side walls and a front wall, said ball being mounted on said bottom wall and said front wall constituting said abutment, said drawbar mounting means also including releasable fastener means extending from the side walls of said housing into supporting engagement with said bumper.

7. A load equalizing hitch assembly comprising in combination a drawbar including a rearwardly open housing having a bottom wall, a front wall and a top wall, a ball, a vertical jack secured to said draft tongue and having a socket projecting into said housing and engaging said ball, a vertical jack secured to said draft tongue and having a vertically movable jack element, a stabilizer bar inserted in said housing in supporting engagement with the underside of said top wall and projecting rearwardly from the housing, and means operatively connecting said jack element to the rear end of said stabilizer bar whereby to prevent sagging of the hitch assembly at the ball and socket.

8. The device as defined in claim 7 wherein said stabilizer bar is relisiently tensioned in the vertical direction.

9. The device as defined in claim 7 wherein the front wall of said housing is provided with an opening having the front end of said stabilizer bar removably inserted therein.

10. The device as defined in claim 7 wherein said means operatively connecting said jack element to said stabilizer bar are vertically adjustable.

References Cited

UNITED STATES PATENTS

| | | | |
|---|---|---|---|
| 2,715,034 | 8/1955 | Cornwall | 280—406 |
| 2,789,834 | 4/1957 | Chism | 280—406 |
| 2,863,673 | 12/1958 | Lisota | 280—406 |
| 3,084,953 | 4/1963 | McGregor | 280—150.5 |
| 3,321,181 | 5/1967 | Wagner | 254—86 |

LEO FRIAGLIA, *Primary Examiner.*

U.S. Cl. X.R.

254—86; 280—150.5, 475, 479